United States Patent
Takahashi et al.

(10) Patent No.: US 7,257,637 B2
(45) Date of Patent: Aug. 14, 2007

(54) METHOD FOR TRANSFORMING DATA BETWEEN BUSINESS PROTOCOLS

(75) Inventors: Makoto Takahashi, Shinagawa (JP); Hiroshi Koike, Maebashi (JP); Norio Takahashi, Yokohama (JP); Shuuichi Kawakita, Isehara (JP); Osamu Moriya, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 889 days.

(21) Appl. No.: 10/316,682

(22) Filed: Dec. 10, 2002

(65) Prior Publication Data

US 2003/0135482 A1 Jul. 17, 2003

(30) Foreign Application Priority Data

Dec. 11, 2001 (JP) ............................. 2001-376585

(51) Int. Cl.
*G06F 15/16* (2006.01)

(52) U.S. Cl. ...................... 709/230; 709/227; 709/246; 709/203; 707/100; 707/101

(58) Field of Classification Search ............... 709/203, 709/219, 227, 230, 246; 707/100, 101
See application file for complete search history.

(56) References Cited

U.S. PATENT DOCUMENTS

| 5,557,780 | A | * | 9/1996 | Edwards et al. | ............... 703/27 |
| 5,794,234 | A | * | 8/1998 | Church et al. | ................. 707/4 |
| 6,741,610 | B1 | * | 5/2004 | Volftsun et al. | ............ 370/466 |
| 6,976,174 | B2 | * | 12/2005 | Terrell et al. | ................. 726/22 |
| 2002/0010798 | A1 | * | 1/2002 | Ben-Shaul et al. | ......... 709/247 |

* cited by examiner

*Primary Examiner*—Ario Etienne
*Assistant Examiner*—Barbara Burgess
(74) *Attorney, Agent, or Firm*—Townsend and Townsend and Crew LLP

(57) ABSTRACT

A data transforming method is provided which can perform a transforming process of transforming collective order data for a plurality of products into individual order data for each individual product and a transforming process in which order data is inherited to a response data transforming process. For each combination of transform source and destination protocols, various designation information is stored beforehand in a mapping definition information area and transaction data is transferred in accordance with the designation information. Designation information includes information of a request for an individual order data division process and a collective response data collection process and information of a correspondence between data items of transaction data.

13 Claims, 13 Drawing Sheets

TODO: RESPONSE TIME LIMIT CHECK PROCESS

METHOD FOR TRANSFORMING DATA BETWEEN BUSINESS PROTOCOLS

BACKGROUND OF THE INVENTION

The present invention relates to data transforming techniques of transforming transaction data among a plurality of business protocols.

The Internet is now prevailing worldwide and is used not only for the transmission/reception of emails and as a browsing means for home pages but also as electronic commerce means between enterprises. In order to realize electronic commerce between enterprises, it is necessary to stipulate in advance standard specifications called business protocols which define the formats and procedures of transaction data to be exchanged in information systems which enterprises have configured for order placing/receiving transactions and the like.

EIAJ-EDI standards by the JEITA (Japan Electronics and Information Technology Industries Association) and EDI-FACT by the U. N. association UN/CEFACT are well known as business protocols used to date. The format of transaction data stipulated by these business protocols has been designed on the assumption that the contents of one order are written in one transaction data set and the contents of a plurality of orders cannot be written collectively in one transaction data set. Therefore, if information of a plurality of orders is to be transmitted at a time, a plurality of transaction data sets each describing each independent order are created and these transaction data sets are transmitted in bundle. In the new trend of electronic commerce between enterprises, business protocols using the transaction data format, XML (Extensible Markup Language), are stipulated one after another. Such business protocols include: PIP (Partner Interface Process) stipulated by the XML-EDI stipulation association for electronic components and semiconductor industries, RosettaNet; ebXML (Electronic Business XML) stipulated by OASIS and UN/CEFACT; and the like. With the format of transaction data defined by these business protocols, it is possible to collectively write a plurality of orders in one transaction data set by repeating XML tags.

Some innovative enterprises have already adopted new business protocols for electronic commerce transactions among enterprises, whereas many enterprises consider to continue electronic commerce transactions for the present time by using already existing information systems which implement conventional business protocols such as EIAJ-EDI standards and EDIFACT. It is therefore desired to realize electronic commerce transactions between enterprises by using transaction data defined by different business protocols.

Methods for realizing electronic commerce transactions between enterprises by using transaction data defined by different business protocols are disclosed in U.S. Pat. No. 5,557,780 and U.S. Pat. No. 5,794,234.

With the method "Electronic data interchange system for managing non-standard data" of the former U.S. Pat. No. 5,557,780, processes in an enterprise information system are executed by using transaction data of the format specific to the enterprise. On the other hand, for the transfer of transaction data to an information system outside the enterprise, the transaction data of the format specific to the enterprise is transformed into the transaction data of an universal format covering various transaction contents by using a data conversion program of the enterprise. This transformed transaction data is transferred to a partner enterprise. In this manner, electronic commerce transactions between enterprises become possible while allowing transaction data having the format specific to each enterprise to be used by the enterprise.

With "Method and system for providing electronic commerce between incompatible data processing systems" of the latter U.S. Pat. No. 5,794,234, transaction data received by an e-mail from a partner enterprise is transformed into the transaction data having the format specific to an enterprise which received the e-mail. The transformed transaction data is stored in the enterprise and used for processes in an enterprise information system. For the transfer of transaction data to the external information system, the transaction data stored as having the specific format is transformed into the transaction data having the format of the partner enterprise by using a data conversion program provided at the enterprise. The transformed transaction data is transmitted back to the partner enterprises. In this manner, electronic commerce transactions between enterprises become possible while allowing transaction data having the format specific to each enterprise to be used by the enterprise.

With such conventional techniques, however, it is difficult to distinguish between the meanings of data items of transaction data and to transform collective order data of a plurality of products into independent order data of each product and transfer such order data between enterprises. Also with such conventional techniques, it is difficult to transfer information which is lost when order data is transformed but becomes necessary when response data to the order data is transformed.

SUMMARY OF THE INVENTION

An object of the invention is to mitigate the above-described problems and provide a data transforming method capable of transforming order data of a plurality of products into independent order data of each product.

In order to achieve the above object, the invention provides a data transforming method wherein input data containing a transmission destination business protocol type and order information of a plurality of products is divided into a plurality of data sets each containing order information of each individual product in accordance with a data transforming procedure specific to each business protocol type.

Other objects, features and advantages of the invention will become apparent from the following description of the embodiments of the invention taken in conjunction with the accompanying drawings.

DESCRIPTION OF THE EMBODIMENTS

First Embodiment

Embodiments of the invention will be described in detail with reference to the accompanying drawings. The invention provides a plurality of data transforming methods having different functions and being able to achieve the above-described object. In the first embodiment, a first data transforming method will be described.

The first data transforming method has the following two objects.

A first object is to provide a data transforming method capable of transforming collective order data of a plurality of produces into individual order data of each independent product.

A second object is to provide a data transforming method capable of transforming individual response data to individual order data of each individual product into collective response data of a plurality of products.

The data transforming method provided by the invention is realized as a data transforming program running on a general computer.

According to the invention, if each enterprise prepares only mapping definition information to be referred to by a data transforming program, transaction data can be transferred to and from a partner enterprise even if the information system implemented with a business protocol used by the partner enterprise is not prepared at the enterprise.

Figure 1:
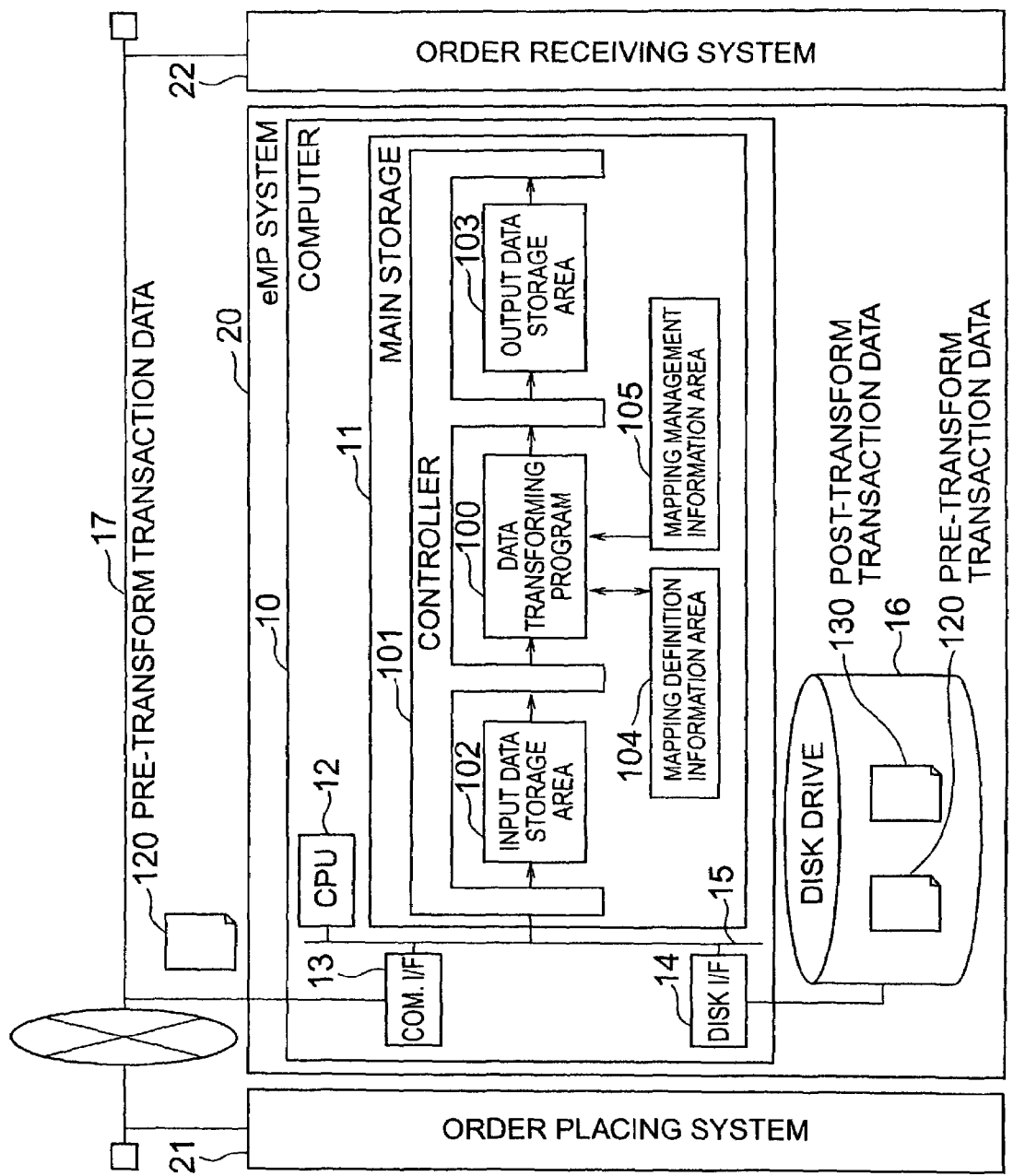
FIG. 1 is a diagram showing the structure of a computer system to which the invention is applied.

With reference to FIG. 1, the structure of an eMP (e-Market Place) system 20 will be described which runs a data transforming program 100 realizing the data transforming method provided by the invention.

Referring to FIG. 1, the eMP system 20 is constituted of a computer 10 and a disk drive 16, and connected to a network 17. Via the network 17, the eMP system 20 is connected to an order placing system 21 which is a transaction system of an order placing enterprise and an order receiving system 22 which is a transaction system of an order receiving enterprise. In this embodiment, transaction data such as order data and response data is transferred via the network 17. A method of transferring transaction data may be a method of directly receiving/supplying a storage medium storing transaction data.

The computer 10 is connected to the network 17 and disk drive 16. The computer 10 has: as its constituent elements, a main storage medium 11 for storing programs and data; a CPU 12 for performing calculations; a communication interface 13 for the network 17; a disk interface 14 for the disk drive 16; and a bus 15 for connecting these elements.

Pre-transform transaction data 120 such as pre-transform order data and pre-transform response data to be input to the data transforming program 100 in the main storage device 11 is acquired from the network 17 or disk drive 16. The data transforming program 100 outputs and writes post-transform transaction data 130 in the disk drive 16.

The main storage device 11 has: as its constituent elements, a controller 101 for controlling the whole of a series of processes; the data transforming program 100 which is called by the controller 101, input with the pre-transform transaction data 120 and outputs post-transform transaction data 130 to the disk drive 16; an input data storage area 102 which is the working area; an output data storage area 103; a mapping definition information area 104 which is a definition information data area; and a mapping management information area 105 which is a management information data area.

Next, modules in the main storage device 11 will be described.

The controller 101 is a module for controlling the whole of a series of processes including a process of reading the pre-transform transaction data 120 and writing the post-transform transaction data 130 in the disk drive 16. The controller 101 reads the pre-transform transaction data 120 via the communication interface 13 or disk interface 14 and stores it in the input data storage area 102. The controller 101 calls the data transforming program 100. The controller 101 is a module for outputting the transformed data. In this embodiment, the controller 101 outputs transformed data stored in the output data storage area 103 to the disk drive 16 as the post-transform transaction data 130. The output destination of transformed data may be another data structure or another program.

Next, data areas of the main storage device 11 will be described.

The input data storage area 102 is a working area for storing data to be transferred between the controller 101 and data transforming program 100.

The output data storage area 103 is the working area for storing transformed data, the data transforming program 100 operates to write the data, and the controller 101 refers to the written data.

The mapping definition information area 104 is the data area for storing mapping definition information representative of a correspondence of individual data items between the pre-transform transaction data 120 and post-transform transaction data 130. This mapping definition information is preset prior to the start-up of the controller 101 and referred to by the data transforming program 100.

The mapping management information area 105 is the data area for storing mapping management information necessary for the data transforming process, the data transforming program 100 writing the mapping management information and referring to it.

The computer 10 is structured as described above.

Next, the flow of a series of processes will be described.

Upon reception of the pre-transform transaction data 120 from the order placing system 21 or order receiving system 22 via the network 17 or disk drive 16, the controller 101 of the eMP system 20 stores the pre-transform transaction data 120 in the input data storage area 102.

Next, the controller 101 activates the data transforming program 100 and supplies the stored pre-transform transaction data 120. Upon reception of the pre-transform transaction data 120, the data transforming program 100 generates the post-transform transaction data 130 in accordance with the mapping definition information stored in the mapping definition information area 104 and the mapping management information stored in the mapping management information area 105 and stores the post-transform transaction data 130 in the output data storage area 103.

Lastly, the controller 101 receives the post-transform transaction data 130 and outputs it to the disk drive 16.

With the series of operations described above, the pre-transform transaction data 120 is transformed into the post-transform transaction data 130 and stored in the disk drive 16.

Next, with reference to a data flow diagram, the flow of a series of transaction data among the three systems including the eMP system 20, order placing system 21 and order receiving system 22 will be described.

Figure 2:
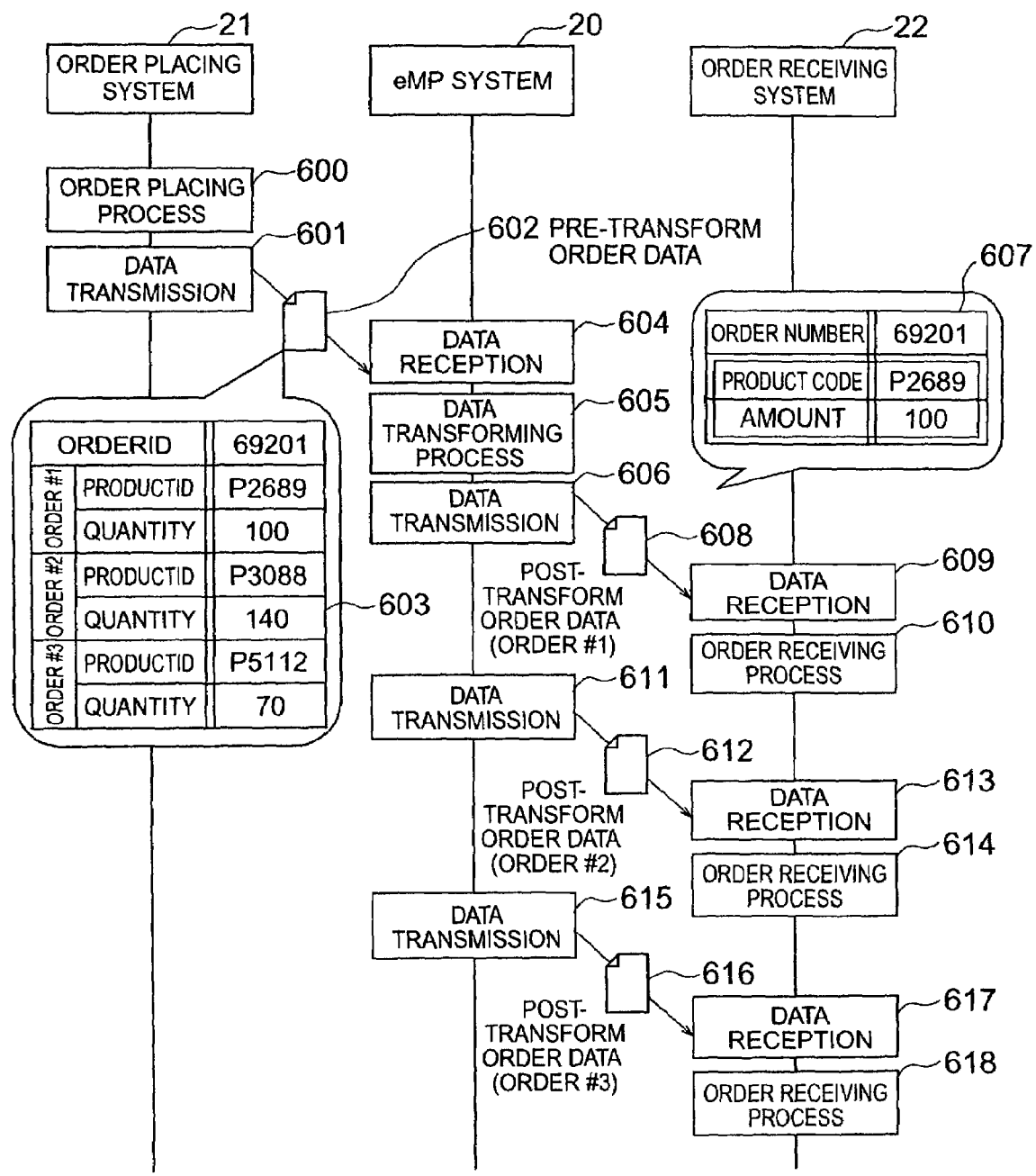
FIG. 2 is a data flow diagram of order data between systems.

First, with reference to FIG. 2, a flow of transaction data when the order placing system 21 transmits order data to the order receiving system 22 via the eMP system 20 will be described. FIG. 2 is the data flow diagram illustrating the process of transferring order data.

After the order placing system 21 performs an order placing process (600), it transmits pre-transform order data 602 to the eMP system 20 (601). In the example shown in FIG. 2, the pre-transform order data 602 is collectively written with the order data of a plurality of products for orders #1 to #3 (603).

The eMP system 20 receives the pre-transform order data 602 (604), transforms it into the data having the data format capable of being used by the order receiving system 22, and outputs a plurality of post-transform order data sets if necessary (605). In the example shown in FIG. 2, the pre-transform order data 602 is divided into three post-transform order data sets each written with the order data of each product (608, 612, 616). The eMP system 20 transmits post-transform order data 608 of the order #1 to the order receiving system 22 (606). The order receiving system 22 receives the post-transform order data 608 of the order #1 (609) and performs an order receiving process (610).

Similarly, the eMP system 20 transmits post-transform order data 612, 616 of the order #2, #3 to the order receiving system 22 (611, 615). The order receiving system 22 receives the post-transform order data 612, 616 of the order #2, #3 (613, 617) and performs the order receiving process (614, 618).

With the transfer of a series of transaction data described above, order data is transmitted from the order placing system 21 to the order receiving system 22 via the eMP system 20.

Figure 3:
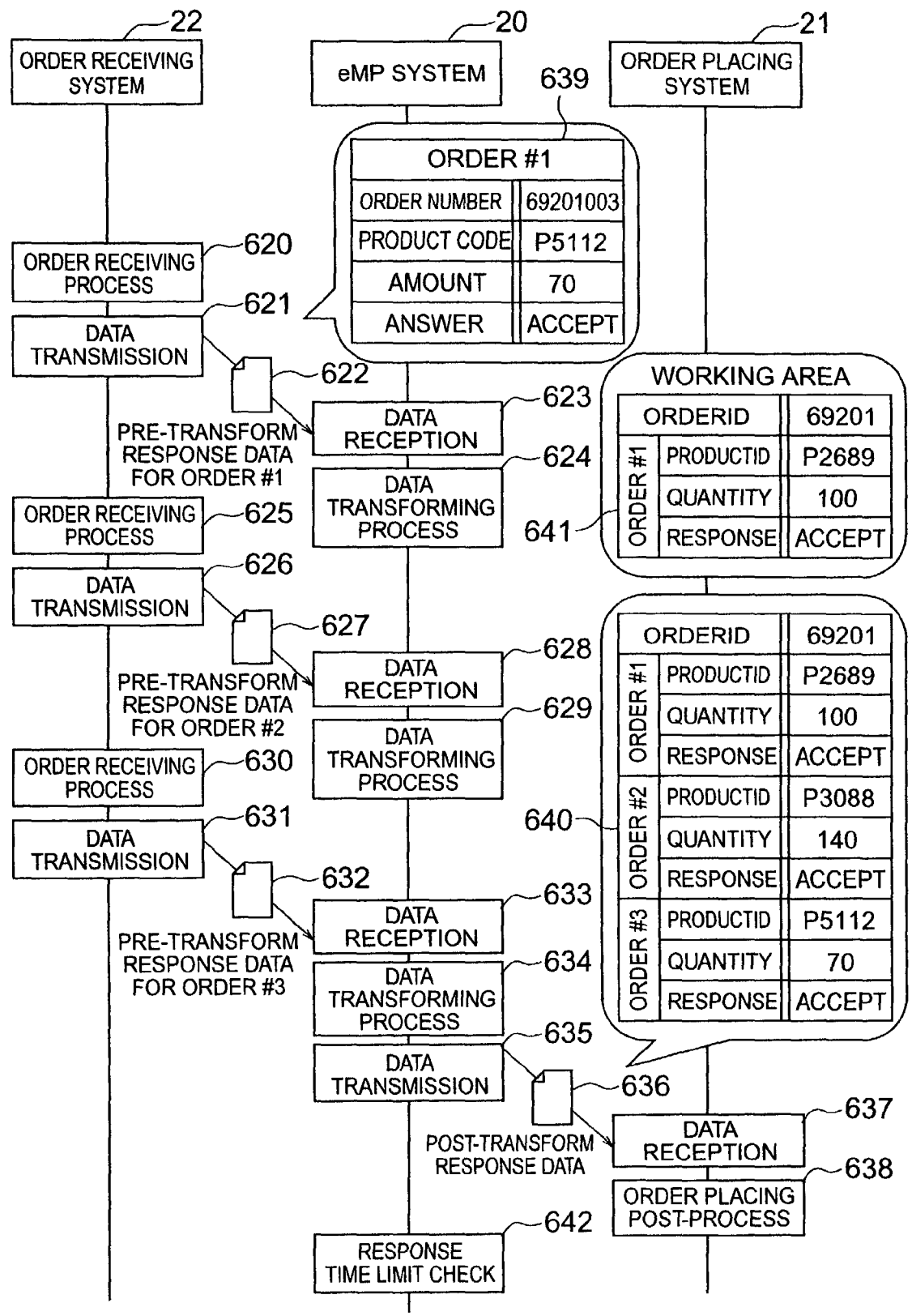
FIG. 3 is a data flow diagram of response data between systems.

Next, with reference to FIG. 3, a flow of transaction data when the order receiving system 22 returns response data to the order placing system 21 via the eMP system 20 will be described. FIG. 3 is a data flow diagram illustrating the process of transferring response data.

After the order receiving system 22 performs the order receiving process (620), it transmits pre-transform response data 622 to the eMP system 20 (621). In the example shown in FIG. 3, in addition to the order data of the order #1, response data representative of whether the order conditions are accepted or not is written in the pre-transform response data 622 (639).

The eMP system 20 receives the pre-transform response data 622 (623), transforms it into the data having the data format capable of being used by the order placing system 21 (624), and stores the response data of the order #1 in the working area (641).

Similarly, after the order receiving system 22 performs the order receiving process for the order data of the order #2, #3 (625, 630), it transmits pre-transform response data 627, 632 of the order #2, #3 to the eMP system 20 (626, 631).

The eMP system 20 receives the pre-transform response data 627, 632 of the order #2, #3, transforms it into the data having the data format capable of being used by the order placing system 21, and if necessary, adds it to the post-transform response data of the order #1 already stored in the working area to thereby form post-transform response data 636 (629, 634). In the example shown in FIG. 3, the response data of the orders #1, #2 and #3 is collectively written in the post-transform response data 636 (640).

The eMP system 20 transmits the post-transform response data 636 to the order placing system 21 (635). The order receiving system 21 receives the post-transform response data 636 (637) and performs an order placing process (638).

With the transfer of a series of transaction data, response data is transmitted from the order receiving system 22 to the order placing system 21 via the eMP system 20.

Next, with reference to the accompanying drawings, the procedure of the data transforming program 100 will be described. In this embodiment, the data transforming program 100 is implemented with the first data transforming method among a plurality of data transforming methods provided by the invention.

The features of the first data transforming method reside in that in accordance with a combination of transform source and destination protocols, whether a process of dividing collective order data into individual order data is to be performed at the time of transforming order data is determined and the type of mapping definition information is determined, that in accordance with a combination of transform source and destination protocols, whether response data sets are to be collected at the time of transforming response data is determined and the type of the mapping definition information is determined, and an error process to be executed when all response data cannot be collected before a predetermined response data arrival time limit.

Figure 4:
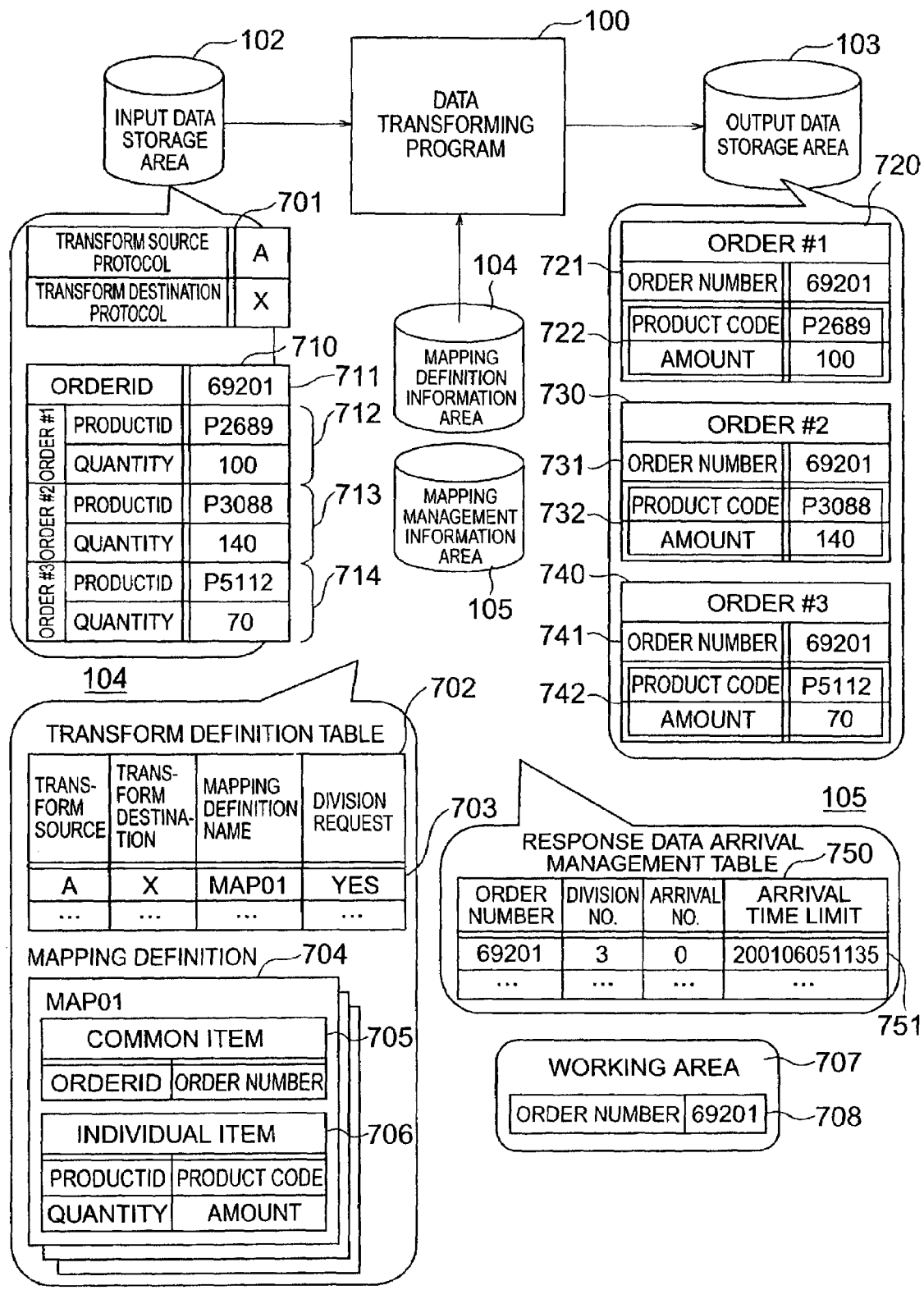
FIG. 4 is a diagram illustrating the operation principle of an order data transforming method according to a first data transforming method.
Figure 5:
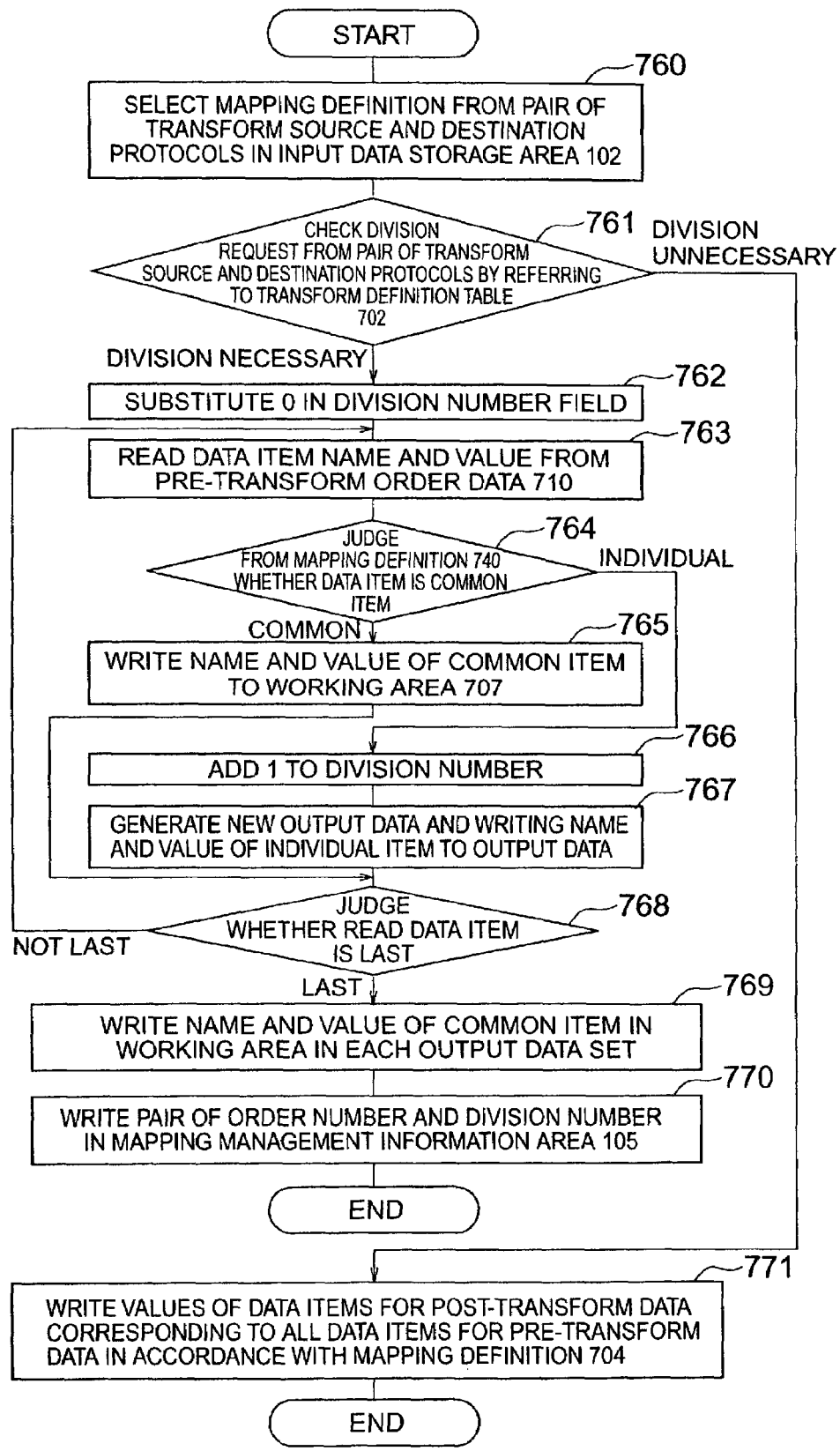
FIG. 5 is a flow chart illustrating an order data transforming process according to the first data transforming method.

First, with reference to FIGS. 4 and 5, the procedure of transforming order data among the procedures of the first data transforming method will be described. FIG. 4 is a diagram illustrating the operation principle of the order data transforming process of the first data transforming method, and FIG. 5 is a flow chart illustrating the procedure of the data transforming program 100.

The data transforming program 100 reads a pair of transform source and destination business protocols from the input data storage area 102, searches a mapping definition name corresponding to the read pair of business protocols from a transform definition table 702 in the mapping definition information area 104, and selects the mapping definition information corresponding to the searched mapping definition name (Step 760). In the example shown in FIG. 4, a pair 701 of business protocols "A" and "X" stored in the input data storage area 102 corresponds to the mapping definition name "MAP01" 703 in the transform definition table 702. Therefore, a mapping definition "MAP01" 704 in the mapping definition information area 104 is selected.

Next, a division request for the order data corresponding to the pair of transform source and destination business protocols is searched from the transform definition table 702 in the mapping definition information area 104 (Step 761). If the division request is "No", values are written in the data items of post-transform data corresponding to all the data items of pre-transform data, in accordance with the mapping definition 704 (Step 771).

In the example shown in FIG. 4, "Yes" 703 is set in the division request field for the pair of business protocols "A" and "X".

If the division request is "Yes", the data transforming program 100 enters "0" in a division number field (Step 762) and reads a pair of the name and value of the first data item from the pre-transform order data 710 (Step 763). In the example shown in FIG. 4, the pair 711 of the name and value of the first data item in the pre-transform order data 710 is "OrderId" and "69201".

Next, the read name of the data item is searched from the mapping definition 704 in the mapping definition information area 104 to judge whether the data item is a common item or an individual item (Step 764). In the example shown in FIG. 4, the name of the first data item read from the pre-transform order data 710 is "OrderId" and it can be judged from the mapping definition 704 that the data item is the common item 705. If the read data item is the common item, the name of the corresponding data item of the post-transform order data is searched from the mapping definition 704 and a pair of the name and value of the data item of the post-transform order data is written in the working area 707 (Step 765). In the example shown in FIG. 4, "Order number" and "69201" 708 are written in the working area 707 as the pair of the name and value of the data item.

Next, it is judged whether the read data item corresponds to the last data (Step 768). If not, a pair of the name and value of the second data item is read (Step 763). In the example shown in FIG. 4, the pair 712 of the name and value of the second data item in the pre-transform order data 710 is "ProductId" and "P2689".

Next, similar to the first data item, the read name of the data item is searched from the mapping definition 704 in the mapping definition information area 104 to judge whether the data item is a common item or an individual item (Step 764). In the example shown in FIG. 4, the name of the second data item read from the pre-transform order data 710 is "ProductId" and it can be judged from the mapping definition 704 that the data item is the individual item 706. If the read data item is the individual item, the post-transform order data as an output data is written in the output data storage area 103 by searching the name of the corresponding data item of the post-transform order data from the mapping definition 704 and writing a pair of the name and value of the corresponding data item of the post-transform order data (Step 767). In the example shown in FIG. 4, post-transform order data 720 of the order #1 is written in the output data storage area 103 by writing "Product Code" and "P2689" as a pair 722 of the name and value of the data item.

With similar processes, a value "100" 722 of the third data item of the pre-transform order data 710 is written as the value of the third data item "Amount" of the post-transform order data 720.

The processes at Steps 766 and 767 are performed for each individual item of the pre-transform order data 710. In the example shown in FIG. 4, after "1" is added to the division number, post-transform order data 730 for the data 713 of the order #2 is generated by writing a pair 732 of the name and value of the data item of the post-transform order data corresponding to each read data item. After "1" is further added to the division number, post-transform order data 740 for the data 714 of the order #3 is generated by writing a pair 742 of the name and value of the data item of the post-transform order data corresponding to each read data item. Up to this Step, the value of the division number becomes "3".

If the read data item is the last data item (Step 768), the pair of the name and value of the common item in the working area 707 is written in each post-transform data set in the output data storage area 103 (Step 769). In the example shown in FIG. 4, the "Order number" and "69201" 721, 731, 741 written as the pair of the name and value of the common item written in the working area 707 at Step 765 are written in each of the post-transform order data sets 720, 730 and 740 of the output data storage area 103.

Lastly, the order number as the identification number of order data, the division number of order data, an arrival number of response data and an arrival time limit 750 are written in the mapping management information area 105 (Step 770). In the example shown in FIG. 4, the order number "69201", the division number "3", the initial arrival number "0" and the arrival time limit "200106051135" 751 are written, "200106051135" representing Jul. 5, 2001 at 11:35 which is the current time added to a predetermined time defined by the business protocol.

The procedure of the order data transforming process of the first data transforming method has been described above. With this procedure, depending upon the contents in the mapping definition information area 104, order data having arbitrary data items or repetition structures defined by a transform source business protocol can be transformed into order data having arbitrary data items defined by a transform destination business protocol.

Namely, if the mapping definition necessary for a division process of order data to be referred to by the data transforming program is prepared, each enterprise can transmit collective order data of a plurality of products to be converted as independent order data of each individual product. The object of the first data transforming method can therefore be achieved.

Figure 6:
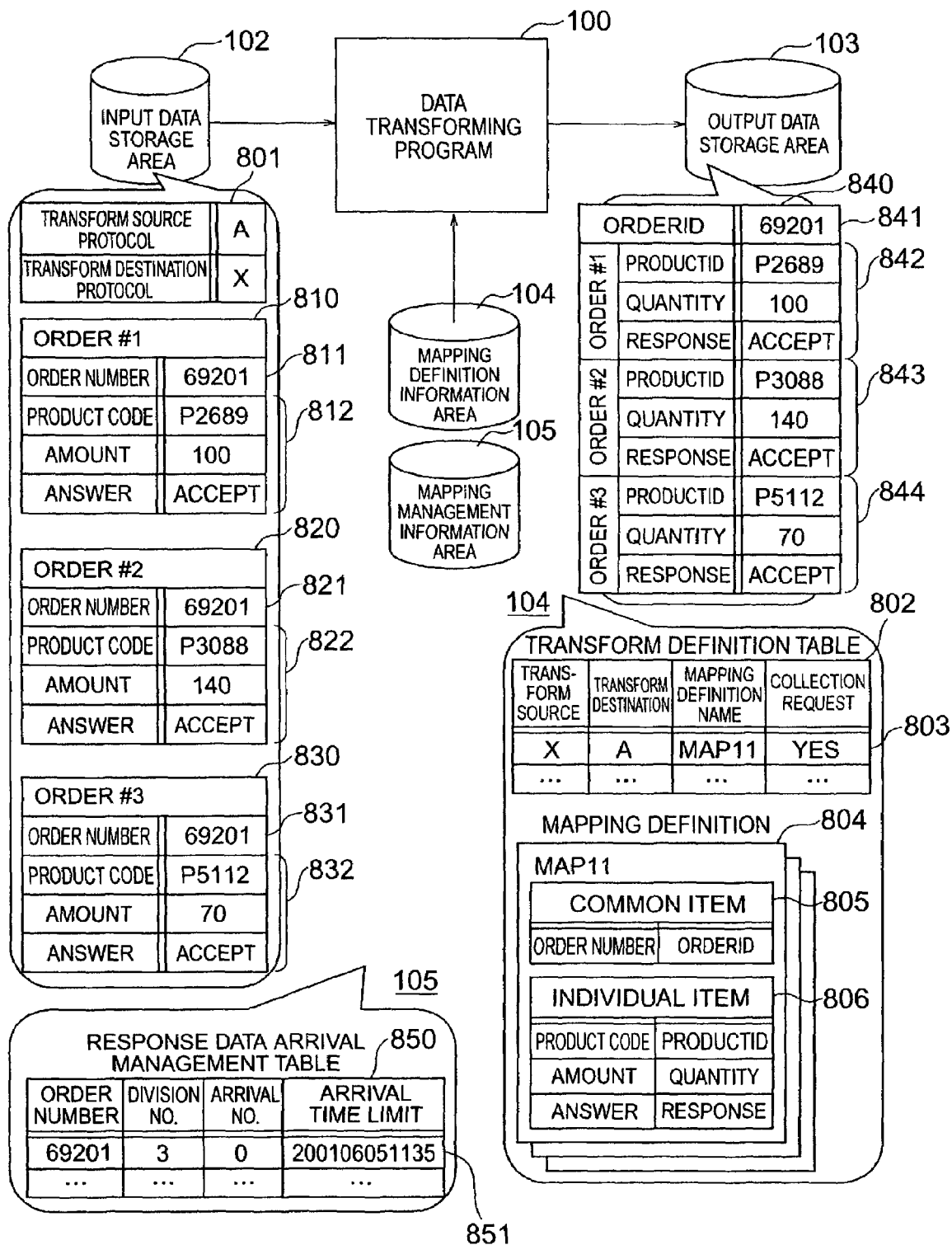
FIG. 6 is a diagram illustrating the operation principle of a response data transforming method according to the first data transforming method.
Figure 7:
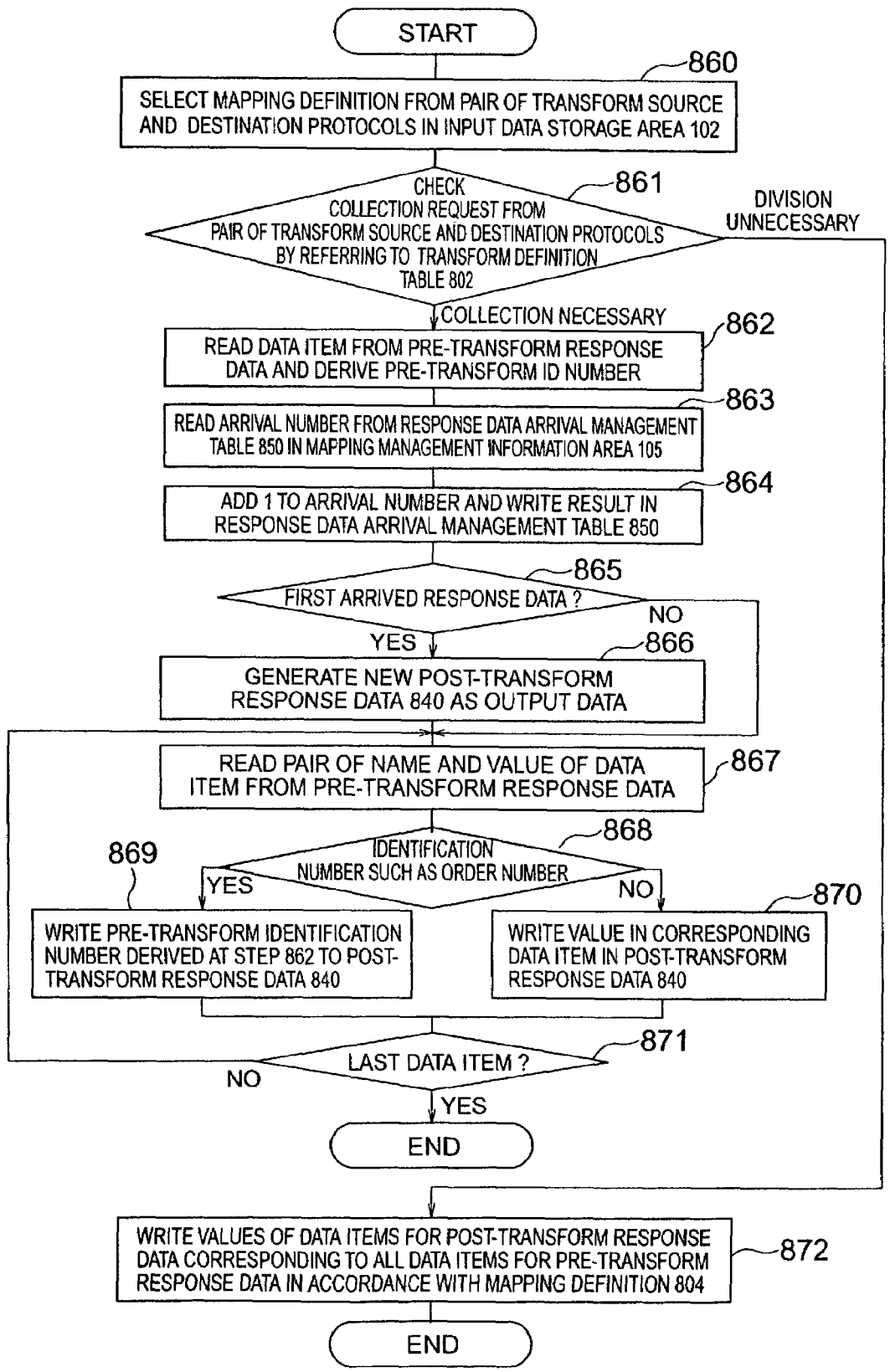
FIG. 7 is a flow chart illustrating a response data transforming process according to the first data transforming method.

Next, with reference to FIGS. 6 and 7, the procedure of transforming response data among the procedures of the first data transforming method will be described. FIG. 6 is a diagram illustrating the operation principle of the response data transforming process of the first data transforming method, and FIG. 7 is a flow chart illustrating the procedure of the data transforming program 100.

The data transforming program 100 reads a pair of transform source and destination business protocols from the input data storage area 102, searches a mapping definition name corresponding to the read pair of business protocols from a transform definition table 802 in the mapping definition information area 104, and selects the mapping definition information corresponding to the searched mapping definition name (Step 860). In the example shown in FIG. 6, a pair 801 of business protocols "X" and "A" stored in the input data storage area 102 corresponds to the mapping definition name "MAP11" 803 in the transform definition table 802. Therefore, a mapping definition "MAP11" 804 in the mapping definition information area 104 is selected.

Next, a collection request for the response data corresponding to the pair of transform source and destination business protocols is searched from the transform definition table 802 in the mapping definition information area 104 (Step 861). If the collection request is "No", values are written in the data items of post-transform response data corresponding to all the data items of pre-transform response data, in accordance with the mapping definition 804 (Step 872).

In the example shown in FIG. 6, "Yes" 803 is set in the division request field for the pair of business protocols "X" and "A".

If the collection request is "Yes", the data transforming program 100 reads the data item corresponding to an identification number of the pre-transform response data 810 from the pre-transform response data (Step 862). In the example shown in FIG. 6, "Order number" is read as the data item corresponding to the identification number, and the pre-transform identification number is derived from the value "69201" 811 of the data item. In this embodiment, since the pre-transform order number is the same as the post-transform order number, the value "69201" itself of the read data item becomes the pre-transform order number.

Next, the arrival number corresponding to the order number is read from a response data arrival management table 850 in the mapping management information area 105 (Step 863). In the example shown in FIG. 6, since the arrival number "0" is set relative to the order number "69201", this value "0" 851 is read.

Next, "1" is added to the read arrival number and the result is written in the response data arrival management table 850 (Step 864). In the example shown in FIG. 6, since the read arrival number is "0", the value "1" obtained by adding "1" to the read number is written in the response data arrival management table 850.

Next, it is judged whether the pre-transform response data currently input is the first arrived response data (Step 865). If the current data is the first arrived response data, Step 866 is executed, whereas if not, Step 867 is executed. At this time, since the arrival number is "1", it can be known that the pre-transform response data 810 currently input is the first arrived response data.

Therefore, the data transforming program 100 executes Step 866 to newly generate the post-transform response data 840 and store it in the output data storage area 103 as output data (Step 866).

Next, a pair of the name and value of the data item is read from the pre-transform response data (Step 867). In the example shown in FIG. 6, "Order number" and "69201" 811 are read as a pair of the data item and name of the first data item from the first arrived pre-transform response data 810.

Next, it is judged whether the read data item corresponds to the identification number of the response data (Step 868). If the read data item corresponds to the identification number of the response data, Step 869 is executed, whereas if not, Step 870 is executed. At this time, since the name of the read data item is "Order number", the data item corresponds to the data item relative to which the identification number of the response data is written.

Therefore, the data transforming program 100 executes Step 869 to write the pre-transform order number derived at Step 862 in the post-transform response data 840 in accordance with the mapping definition 804 (Step 869). In the example shown in FIG. 6, the "Order number" which is the name of the data item of the order number corresponds to "OrderId" 805. Therefore, the value "69201" of the data item is written in the post-transform response data 840 as the value of the data item "OrderId" 841.

Next, it is judged whether the read data item is the last data item (Step 871). If the read data item is the last data item, the data transforming program is terminated. If the read data item is not the last data item and there is still the data item to be read, Step 867 is executed again. Since the presently read data item "Order number" 811 is not the last data item of the pre-transform response data 810, Step 867 is executed.

Next, the data transforming program 100 reads a pair of the name and value of the second data item (Step 867). In the example shown in FIG. 6, "Product code" and "P2689" are read as the pair of the name and value of the second data item of the pre-transform response data 810, 812.

Next, similar to the first data item, it is judged whether the read data item corresponds to the identification number of the response data (Step 868). The read data item is not the identification number of the response data, but it is "Product code".

Therefore, the data transforming program 100 executes Step 870 to search the name of the read data item from the mapping definition 804 and the value of the read data item is written as the value of the corresponding data item of the post-transform response data (Step 870). In the example shown in FIG. 6, the data item name "Product code" corresponds to the data item name "ProductId" 806. Therefore, "P2689" 842 is written as the value of the data item "ProductId" of the post-transform response data 840. Similarly, a data item name "Amount" corresponds to the data item name "Quantity" and its value is "100". Therefore, "100" 842 is written as the value of the data item "Quantity" of the post-transform response data 840. Next, a data item name "Answer" corresponds to a data item name "Response" and its value is "Accept". Therefore, "Accept" 842 is written as the value of the data item "Response" of the post-transform response data 840.

Similarly, data 843 of the second response data 820 for the order #2 843 and data 844 of the third response data 830 for the order #3 are written as the post-transform response data 840.

After the post-transform order data is transmitted to the order receiving system 22, the data transforming program 100 periodically searches the response data arrival limit time corresponding to the identification number such as the order number from the response data arrival management table 850 in the mapping management information area 105, to thereby judge whether the current time is over the response data arrival time limit. In this embodiment, if the current time is over the response data arrival limit time, an error is notified to the order receiving system 22.

The procedure of the order data transforming process of the first data transforming method has been described above. With this procedure, depending upon the contents in the mapping definition information area 104, response data having arbitrary data items defined by a transform source business protocol can be transformed into response data having arbitrary data items or repetition structures defined by a transform destination business protocol.

Namely, if the mapping definition necessary for a collection process of a plurality of response data sets to be referred to by the data transforming program is prepared, each enterprise can receive individual response data to each individual order data from an order receiving system implemented with a business protocol incompatible with collective order placing, collect the response data sets and transform then into response data of a plurality of products. The object of the first data transforming method can therefore be achieved.

Second Embodiment

Next, the second embodiment will be described. In the second embodiment, a second data transforming method among a plurality of data transforming methods provided by the invention will be described.

An object of the second data transforming method is to make each of post-transform order data sets to be output as the order data of an individual product have a unique identification number such as an order number. If this object can be achieved, transaction data can be correctly processed at an information system implemented with a business protocol having the restriction that, for example, an order number as the identification number of order data is required to be unique for all order data sets.

In the second embodiment, the second data transforming method is realized by a program running on a computer system having the same structure as the first embodiment. Different points of the second embodiment from the first embodiment are only a method of supplying the data transforming program with mapping definition information and the procedure of the data transforming program. In the following, these different points will be described and the description of the same functions and operations as those of the first embodiment is omitted.

In the second data transforming method, when collective order data of a plurality of products is divided into individual order data of each product and output, a unique identification number for each of post-transform order data sets is given by combining the identification number of pre-transform order data and an order sequence number of each product.

Figure 8:
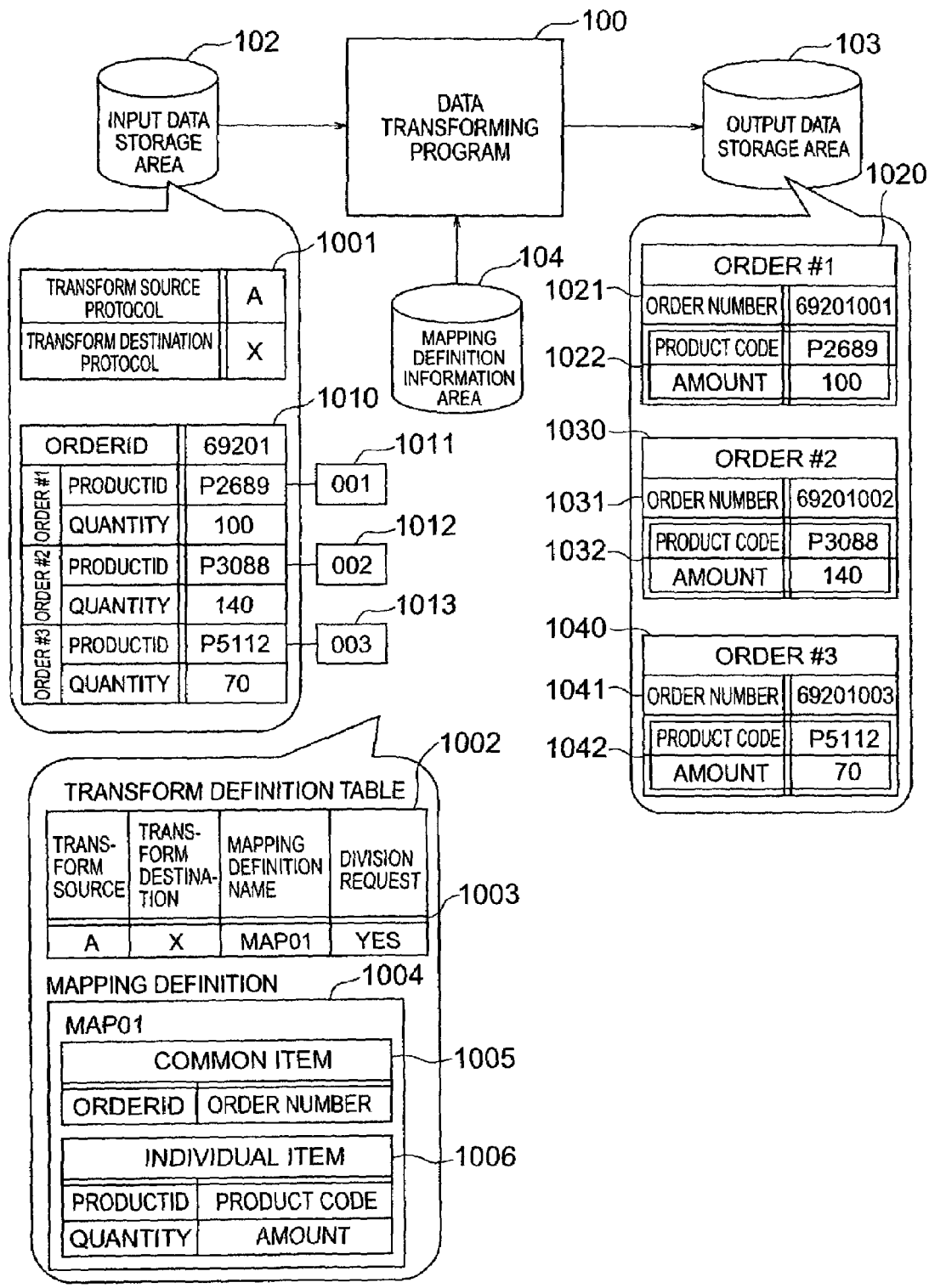
FIG. 8 is a diagram illustrating the operation principle of a second data transforming method.

With reference to FIG. 8, the procedure of the second data transforming method will be described. FIG. 8 is a diagram illustrating the operation principle of the second data transforming method.

The second data transforming method implemented in the data transforming program 100 has the process contents of the first data transforming method as well as the features that the data item as the identification number of order data can be designated and that a unique identification number can be given to the data item of post-transform order data corresponding to the designated data item.

The data transforming program 100 transforms the pre-transform order data stored in the input data storage area 102 into post-transform order data which is output to the output data storage area 103, in accordance with the following procedure.

Similar to the first data transforming method, the data transforming program 100 reads a pair of transform source and destination business protocols from the input data storage area 102, searches a mapping definition name corresponding to the read pair of business protocols stored in the mapping definition information area 104, and selects the mapping definition information. In the example shown in FIG. 8, a pair 1001 of business protocols is "A" and "X" and a mapping definition name designated by a transform definition table 1002 in the mapping definition information area 104 is "MAP01" 1003. Therefore, a mapping definition "MAP01" 1004 is read from the mapping definition information area 104.

Next, a pair of the name and value of the data item is read from the pre-transform order data stored in the input data storage area 102, and post-transform order data to be output is generated. In this case, if the read data item is designated as the identification number of the order data, a new identification is output which is a combination of the value of the read data item and an order sequence number of each product. In the example shown in FIG. 8, the value of the data item "OrderId" of pre-transform order data is "169201" and this data item is the identification number of pre-transform order data. Therefore, as an example of a method of generating a unique identification number, a sequence number "001" of the order #1 is added to the end of the value "69201" of the data item "OrderId", and a character string "69201001" is output as the value of the data item "Order number" of post-transform data 1020 of the order #1. Data items of the order #1, "ProductId" and "Quantity", correspond to data items, "Product code" and "Amount" designated by the mapping definition 1006. Therefore, the values "P2689" and "100" of the data items "ProductId" and "Amount" 1022 are output as the post-transform order data.

Similarly, a sequence number "002" of the order #2 is added to the end of the value "69201" of the data item "OrderId", and a character string "69201002" 1031 is output as the value of the data item "Order number" of post-transform data 1030 of the order #2. "P3088" and "140" 1032 are output as the values of the data items "Product code" and "Amount".

Similarly, a sequence number "003" of the order #3 is added to the end of the value "69201" of the data item "OrderId", and a character string "69201003" 1041 is output as the value of the data item "Order number" of post-transform data 1040 of the order #3. "P5112" and "70" 1042 are output as the values of the data items "Product code" and "Amount".

The procedure of the second data transforming method has been described above. With this procedure, if the data item storing the identification number is designated in the mapping definition, a unique identification number can be given to each post-transform order data set. The object of the second data transforming method can therefore be achieved by this procedure.

Third Embodiment

The third embodiment will be described. In the third embodiment, a third data transforming method among a plurality of data transforming methods provided by the invention will be described.

An object of the third data transforming method is to allow the response data collection process to collect response data received before the response data arrival time limit and transmit the received response data to the order placing system. If this object can be achieved, response data can be transmitted to the order placing system, without discarding the received response data sets even if all the response data sets are not collected before the response data arrival time limit.

In this embodiment, the third data transforming method is realized by a program running on a computer system having the same structure as the first embodiment. A different point of the third embodiment from the first embodiment is only the procedure of the data transforming program. In the following, only the different point will be described and the description of the same functions and operations as those of the first embodiment is omitted.

Figure 9:
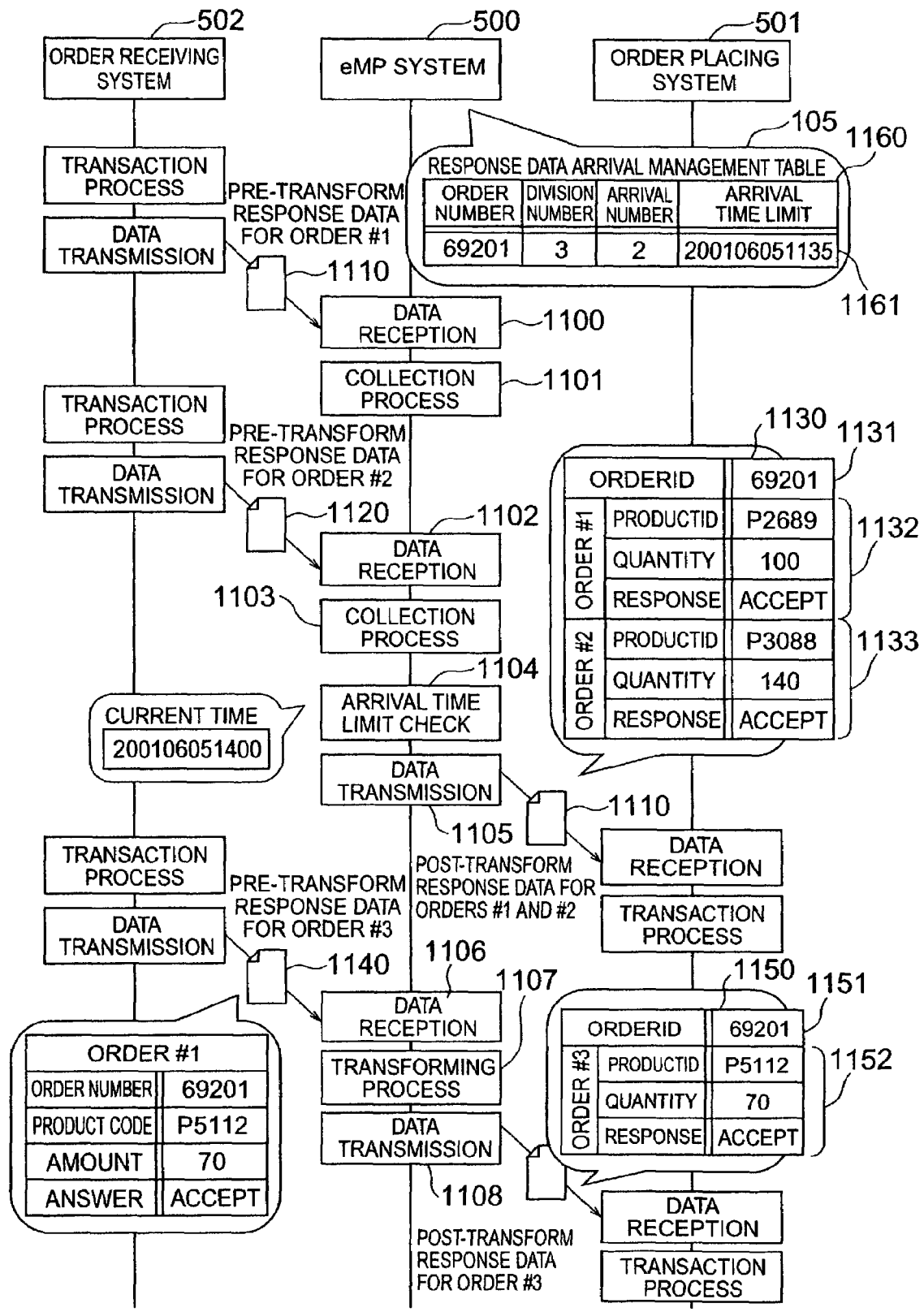
FIG. 9 is a diagram illustrating the operation principle of a third data transforming method.

With reference to FIG. 9, the procedure of the third data transforming method will be described. FIG. 9 is a diagram illustrating the operation principle of the third data transforming method.

The third data transforming method has the following two characteristic features.

According to the first characteristic feature, in the response data collection process, post-transform response data sets transformed from the response data sets received before the response data arrival time limit are transmitted to the order placing system, without judging as an error even if all response data sets are not collected before the response data arrival time limit.

According to the second characteristic feature, if remaining data set or sets arrive after the response data arrival time limit, post-transform response data transformed from the response data set or sets received after the time limit is transmitted to the order placing system.

In this embodiment, although the two characteristic features are realized, they can be realized independently and one of them may be realized.

In this embodiment, the data transforming program 100 is implemented with the third data transforming method providing the above-described two characteristic features, transforms the received response data and transmits it to the order placing system in accordance with the following procedure.

Similar to the data transforming method, the data transforming program 100 performs the response data collection process each time response data arrives.

In the example shown in FIG. 9, pre-transform response data 1110 of the order #1 is received (1100) and the collection process (1101) for the received pre-transform response data is performed. In accordance with the mapping definition information, values 1131, 1132 are written in predetermined data items of post-transform response data 1130. Next, pre-transform response data 1120 of the order #2 is received (1102) and the collection process (1103) for the received pre-transform response data is performed. In accordance with the mapping definition information, values 1133, are written in predetermined data items of the post-transform response data 1130.

The data transforming program 100 periodically searches the response data arrival time limit corresponding to the identification number such as the order number from a response data arrival management table 1161 in the mapping management information area 105, to thereby judge whether the current time is over the response data arrival time limit. If the current time is over the response data arrival time limit, the post-transform response data output before the response data arrival time limit is transmitted to the order placing system.

In the example shown in FIG. 9, an arrival time limit check process (1104) is performed by reading a character string "2001060514440" representative of the current time of Jun. 5, 2001 at 14:40. Since a character string "200106051135" 1161 representative of the arrival time limit of Jun. 5, 2001 at 11:35 corresponding to the order number "69201" is stored in a response data arrival management table 1160 in the mapping management information area 105, it can be known that the current time is over the response data arrival time limit. Therefore, the post-transform response data 1130 output before the response data arrival time limit is transmitted to an order placing system 501 (1105).

If response data is received after the response data arrival time limit, this response data is transformed and post-transform response data is transmitted to the order placing system.

In the example shown in FIG. 9, pre-transform response data 1140 of the order #3 is received after the response data arrival time limit (1106) and a transforming process (1107) is performed for the received pre-transform response data. In accordance with the mapping definition information, values 1151, 1152 are written in predetermined data items of post-transform response data 1150 of the order #3. Next, the post-transform response data 1150 of the order #3 is transmitted to the order placing system 501 (1108).

The procedure of the third data transforming method has been described above. With this procedure, output data after the collection process for response data arrived before the response data arrival time limit can be transmitted as the post-transform response data to the order placing system. Also with this procedure, output data after the collection process for response data arrived after the response data arrival time limit can be transmitted as the post-transform response data to the order placing system. The object of the third data transforming method can therefore by achieved by this procedure.

Fourth Embodiment

The fourth embodiment will be described. In the fourth embodiment, a fourth data transforming method among a plurality of data transforming methods provided by the invention will be described.

An object of the fourth data transforming method is to enable to determine the transform destination data item during the data transform process. If this object can be achieved, the transform destination data item can be determined during the data transforming process in accordance with a difference of the value of the data item of input data, without increasing the number of data items of input data and by using the data items already defined.

In this embodiment, the fourth data transforming method is realized by a program running on a computer system having the same structure as the first embodiment. Different points of the fourth embodiment from the first embodiment are only a method of supplying the data transforming program with mapping definition information and the procedure of the data transforming program. In the following, only the different points will be described and the description of the same functions and operations as those of the first embodiment is omitted.

Figure 10:
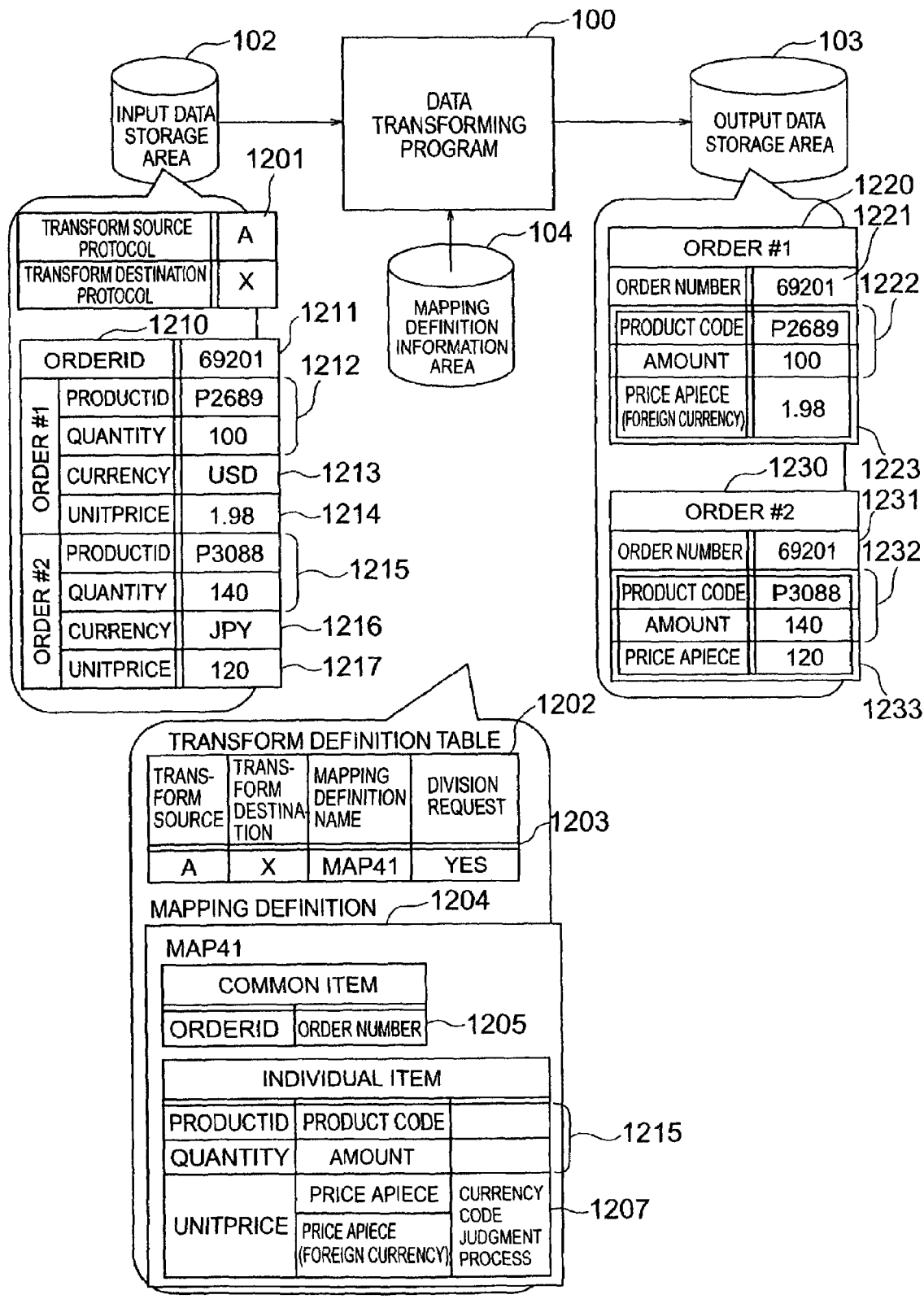
FIG. 10 is a diagram illustrating the operation principle of a fourth data transforming method.

With reference to FIG. 10, the procedure of the fourth data transforming method will be described. FIG. 10 is a diagram illustrating the operation principle of the fourth data transforming method.

The fourth data transforming method has the feature that the mapping definition information contains a correspondence list between the data items of input data and the data items of transformable output data and designates the type of the process of determining a transform destination data item.

In this embodiment, the data transforming program 100 is implemented with the fourth data transforming method having the above-described feature. Upon reception of a pair of transform source and destination protocols stored in the input data storage area 102 and pre-transform data, the data transforming program 100 outputs post-transform data to the output data storage area 103, in accordance with the following procedure.

Similar to the first data transforming method, the data transforming program 100 reads a pair of transform source and destination protocols from the input data storage area 102, searches the mapping definition name corresponding to the pair of protocols from the mapping definition information area 104, and selects the mapping definition in accordance with the searched mapping name.

In the example shown in FIG. 10, "A" and "X" 1201 are stored in the input data storage area 102 as a pair of transform source and destination protocols, and this pair corresponds to a mapping definition name "MAP41" 1203 in the transform definition table 1202 in the mapping definition information area 104. Therefore, a mapping definition "MAP41" 1204 is read from the mapping definition information area 104.

Next, a pair of the name and value of a data item is read from the pre-transform data stored in the input data storage area 102, and in accordance with the mapping definition information, the data item at the transform destination is determined to generate post-transform data. In this case, if a transform destination data item determining process is being designated, the designated transform destination data item determining process is performed.

In the example shown in FIG. 10, the data item "OrderId" corresponds to the data item "Order number" 1205, and the data items "ProductId" and "Quantity" correspond to the data items "Product code" and "Amount" 1206. Therefore, in the data transforming process for the order #1, a value "69201" of the data item "OrderId" of the pre-transform data 1210 is written in the data item "Order number" 1221 of the post-transform order data 1220, and values "P2689" and "100" of the data items "ProductId" and "Quantity" are written in the data items "Product code" and "Amount" 1222 of the post-transform order data. For a data item "UnitPrice", two data items "Price apiece" and "Price apiece (Foreign currency)" are designated for transform destination, and a "currency code judgement process" 1207 is designated as the type of the data transforming process. With these designations, the transform destination data item is determined as "Price apiece (Foreign currency)" from the judgement of a value "USD" 1213 of a data item "Currency" of the pre-transform order data 1210, and a value "1.98" 1014 of a data item "UnitPrice" of the pre-transform order data 1210 is written to the data item "Price apiece (Foreign currency)" 1223 of the post-transform order data 1220.

Similarly, in the data transforming process for the order #2, a value "69201" of the data item "OrderId" of the pre-transform data 1210 is written in the data item "Order number" 1231 of the post-transform order data 1230, and values "P3088" and "140" of the data items "ProductId" and "Quantity" are written in the data items "Product code" and "Amount" 1232. For the data item "UnitPrice", there is a data transforming process designation of the "currency code judgement process". Therefore, the transform destination data item is determined as the "Price apiece" from the judgement of a value "JPY" 1216 of the data item "Currency" of the pre-transform order data 1210. A value "120" 1017 of the data item "UnitPrice" of the pre-transform order data 1210 is written to the data item "Price apiece" 1233 of the post-transform order data 1230.

The procedure of the fourth data transforming method has been described above. With this procedure, if the correspondence list between the data items of input data and the data items of transformable output data items and the type of the transform destination data item determining process are defined in the mapping definition in the mapping definition information area 104, then the data item at the transform destination can be determined during the data transforming process. The object of the fourth data transforming method can therefore be achieved by this procedure.

Fifth Embodiment

The fifth embodiment will be described. In the fifth embodiment, a fifth data transforming method among a plurality of data transforming methods provided by the invention will be described.

An object of the fifth data transforming method is to embed the value of a data item of pre-transform order data which data item does not have a corresponding transform destination data item and to derive the value of this data item from the pre-transform response data. If this can be realized, the value necessary for the response data transforming process can be derived from the input pre-transform response data, by embedding the value in the post-transform order data and writing the value itself in the response data, without storing this value in the data transforming program.

In this embodiment, the fifth data transforming method is realized by a program running on a computer system having the same structure as the first embodiment. Different points of the fifth embodiment from the first embodiment are only a method of supplying the data transforming program with mapping definition information and the procedure of the data transforming program. In the following, only the different points will be described and the description of the same functions and operations as those of the first embodiment is omitted.

Figure 11:
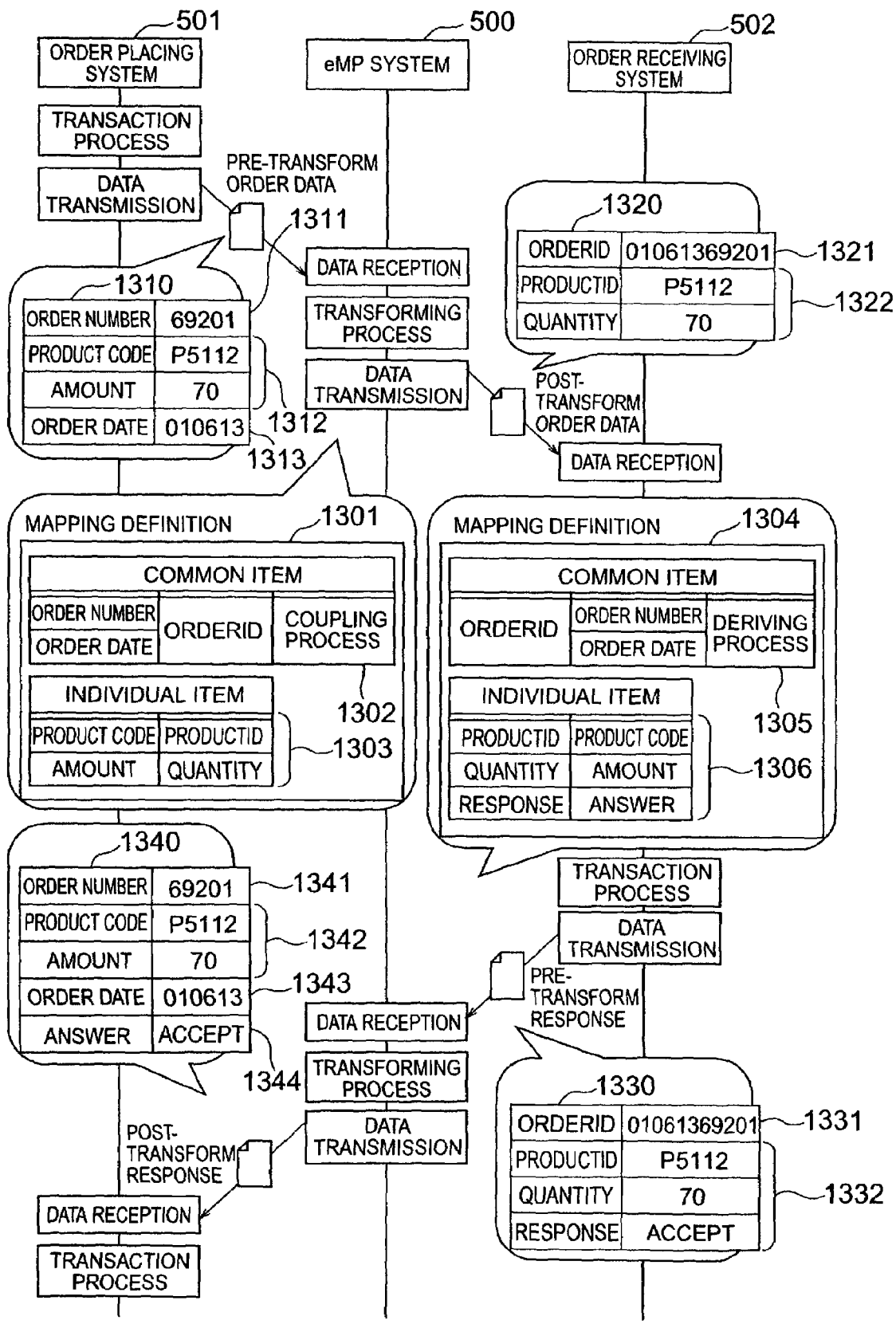
FIG. 11 is a diagram illustrating the operation principle of a fifth data transforming method.

With reference to FIG. 11, the procedure of the fifth data transforming method will be described. FIG. 11 is a diagram illustrating the operation principle of the fifth data transforming method.

The fifth data transforming method has the feature that the type of the data transforming process can be designated in the mapping definition information in correspondence with a pair of the set of transform source data items and the set of transform destination data items.

In this embodiment, the data transforming program 100 is implemented with the fifth data transforming method having the above-described feature. Transaction data is transferred between the order placing system and order receiving system by the following procedure.

Similar to the first data transforming method, the data transforming program 100 receives pre-transform order data from the order placing system 501, and performs a transforming process in accordance with designations in the mapping definition information to generate post-transform order data. In this case, if the data transforming process is designated in correspondence with the data item to be transformed, the designated data transforming process is executed.

In the example shown in FIG. 11, in a mapping definition 1301, a pair of data items "Order number" and "Order date" of pre-transform order data 1310 are related to the data item "OrderId" of post-transform order data 1320 and a "coupling process" 1302 is designated as the type of the data transforming process. Therefore, a value "69201" of the data item "Order number" is coupled to a value "010613" of the data item "Order date" and a character string "01061369201" 1321 is written as the value of the data item "OrderId" of the post-transform order data 1320.

In the mapping definition 1301, data items "Product code" and "Amount" of the pre-transform order data 1320 are related to data items "ProductId" and "Quantity" 1303 of the post-transform order data 1320. Therefore, values "P5112" and "70" 1322 of the data items "Product code" and "Amount" are written as the values of the data items "ProductId" and "Quantity" of the post-transform order data 1320.

Similar to the first data transforming method, the data transforming program 100 receives the pre-transform response data from the order receiving system 502 and executes the transforming process in accordance with the designations in the mapping definition information. In this case, if the data transforming process is designated in correspondence with the data item to be transformed, the designated data transforming process is executed.

In the example shown in FIG. 11, in a mapping definition 1304, the data item "OrderId" of pre-transform response data 1330 is related to a pair of the data items "Order number" and "Order date" of post-transform response data 1340, and a "deriving process" 1305 is designated as the type of the data transforming process. Therefore, character strings "010613" and "69201" are derived from the value "01061369201" of the data item "OrderId", and the derived character strings are written as the values of the data items "Order number" and "Order date" 1341, 1343 of the post-transform response data 1340.

In the mapping definition 1304, the data items "ProductId", "Quality" and "Response" of the pre-transform response data 1330 are related to the data items "Product code", "Amount" and "Answer" 1306 of the post-transform response data 1340. Therefore, the values "P5112", "70" and "Accept" of the data items "ProductId", "quantity" and "Response" are written as the values of the data items "Product code", "Amount" and "Answer" 1342, 1344 of the post-transform response data 1340.

The procedure of the fifth data transforming method has been described above. With this procedure, in the mapping definition information for order data transforming, if a data transforming process of generating the value of a transform destination data item by combining values of a plurality of transform source data items is designated in correspondence with a pair of the set of transform source data items and the set of transform destination data items, then the value of an arbitrary data item of pre-transform order data, which data item does not have a corresponding transform destination data item, can be embedded as the value of a predetermined data item of the post-transform order data. Furthermore, in the mapping definition information for response data transforming, if a data transforming process of deriving values of a plurality of data items from the value of a data item of the pre-transform response data is designated in correspondence with a pair of the set of transform source data items and the set of transform destination data items, then the values of an arbitrary data item of pre-transform order data can be derived from the pre-transform response data during the response data transforming process. The object of the fifth data transforming method can therefore be achieved by this procedure.

Sixth Embodiment

The sixth embodiment will be described. In the sixth embodiment, a sixth data transforming method among a plurality of data transforming methods provided by the invention will be described.

An object of the sixth data transforming method is to designate beforehand in the mapping definition information the value of a data item of pre-transform order data which was embedded in post-transform order data and is necessary for response data transforming. If this can be realized, even if the value of a data item of pre-transform order data is not written in the pre-transform response data transmitted from the order receiving system, the transforming process can be continued by writing the value designated in the mapping definition information in the data item of the post-transform response data.

In this embodiment, the sixth data transforming method is realized by a program running on a computer system having the same structure as the fifth embodiment. Different points of the sixth embodiment from the fifth embodiment are only a method of supplying the data transforming program with mapping definition information and the procedure of the data transforming program. In the following, only the different points will be described and the description of the same functions and operations as those of the fifth embodiment is omitted.

Figure 12:
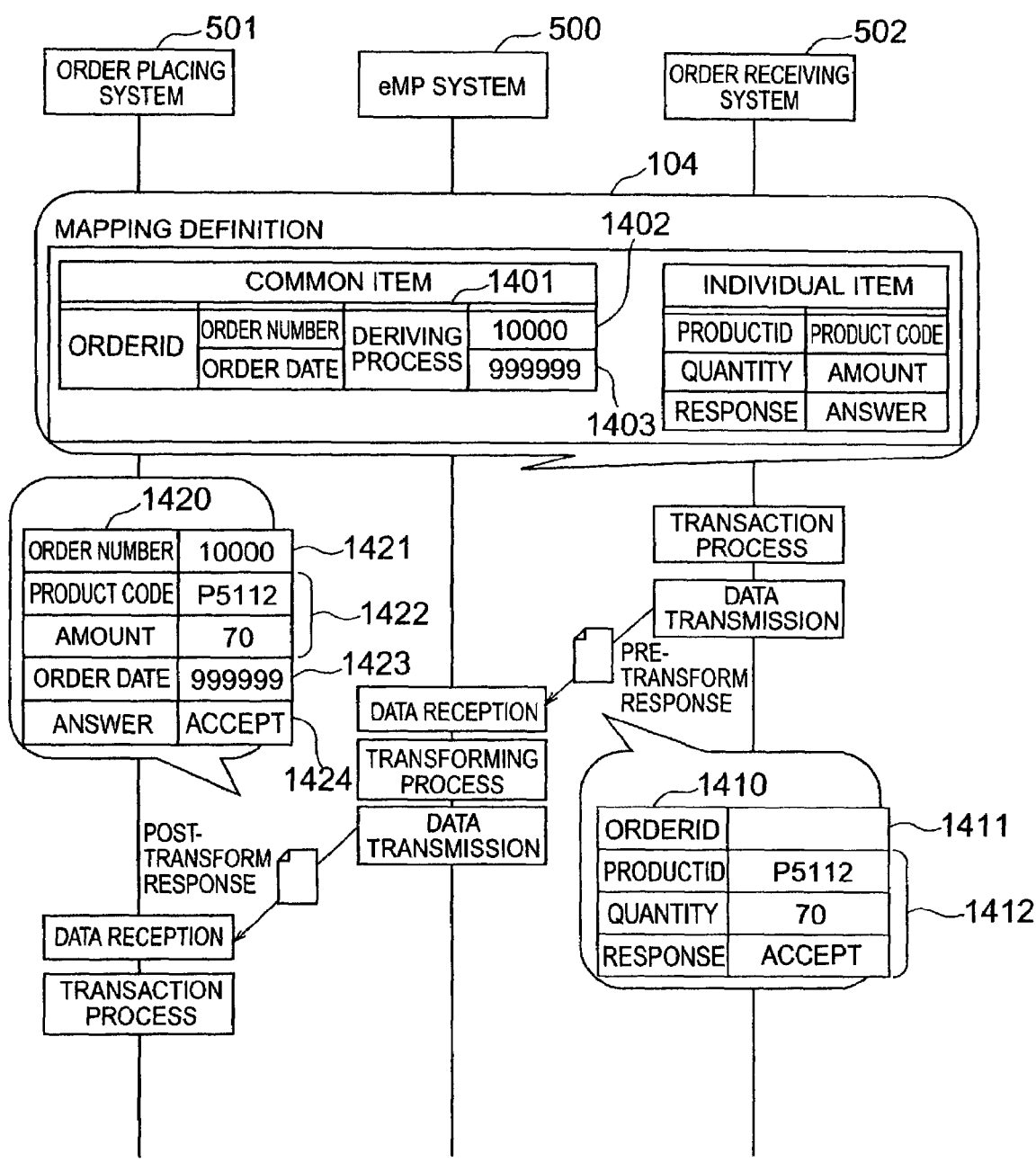
FIG. 12 is a diagram illustrating the operation principle of a sixth data transforming method.

With reference to FIG. 12, the procedure of the sixth data transforming method will be described. FIG. 12 is a diagram illustrating the operation principle of the sixth data transforming method.

The sixth data transforming method has the feature that the type of the data transforming process and a specified value of a data item can be designated in the mapping definition information in correspondence with a pair of the set of transform source data items and the set of transform destination data items.

In this embodiment, the data transforming program 100 is implemented with the sixth data transforming method having the above-described feature. Transaction data is transferred between the order placing system and order receiving system by the following procedure.

Similar to the fifth data transforming method, the data transforming program 100 performs the response data transforming process of deriving values of a plurality of data items from pre-transform response data, in accordance with the data transforming process designated in the mapping definition information area 104. In this case, if a value necessary for the response data transforming process is not written in the pre-transform response data, a specified value designated in the mapping definition information area 104 is written in each transform destination data item. In the example shown in FIG. 12, values "P5112", "70" and "Accept" of the data items "ProductId", "quantity" and "Response" of pre-transform response data 1410 are written as the values of data items "Product code", "Amount" and "Answer" 1422, 1424 of post-transform response data 1420, in accordance with the designations in the mapping definition information area 104. Next, a predetermined data transforming process is executed because a "deriving process" 1401 is designated in the data item "OrderId" of pre-transform response data 1410 in the mapping definition information 104. However, a value 1411 of the data item "OrderId" of the pre-transform response data 1410 necessary for the data transforming process is not written. In this case, specified values "10000" and "999999" of the data items "Order number" and "Order date" 1421, 1423 designated in the mapping definition information area 104 are written in the predetermined data items of the post-transform response data 1420.

The procedure of the sixth data transforming method has been described above. With this procedure, in the mapping definition information for response data transforming, if a specified value of each transform destination data item is designated in correspondence with a pair of the set of transform source data items and the set of transform destination data items, then the transforming process can be continued by writing the specified value in each transform destination data item even if the value necessary for the transforming process is not written in the pre-transform response data. The object of the sixth data transforming method can therefore be achieved by this procedure.

Seventh Embodiment

The seventh embodiment will be described. In the seventh embodiment, a seventh data transforming method among a plurality of data transforming methods provided by the invention will be described.

An object of the seventh data transforming method is to enable to compare a value written in pre-transform response data with the value of a data item of pre-transform order data which value was embedded in post-transform order data and is necessary for the response data transforming process. If this can be achieved, the data transforming process can be switched in accordance with a judgement result of whether the value of a data item was changed by the order placing system.

In this embodiment, the seventh data transforming method is realized by a program running on a computer system having the same structure as the fifth embodiment. There are three different points of the seventh embodiment from the fifth embodiment include three points: a method of supplying the data transforming program with mapping definition information; the procedure of the data transforming program; and data stored in the mapping management information area 105. In the following, these different points will be described and the description of the same functions and operations as those of the fifth embodiment is omitted.

Figure 13:
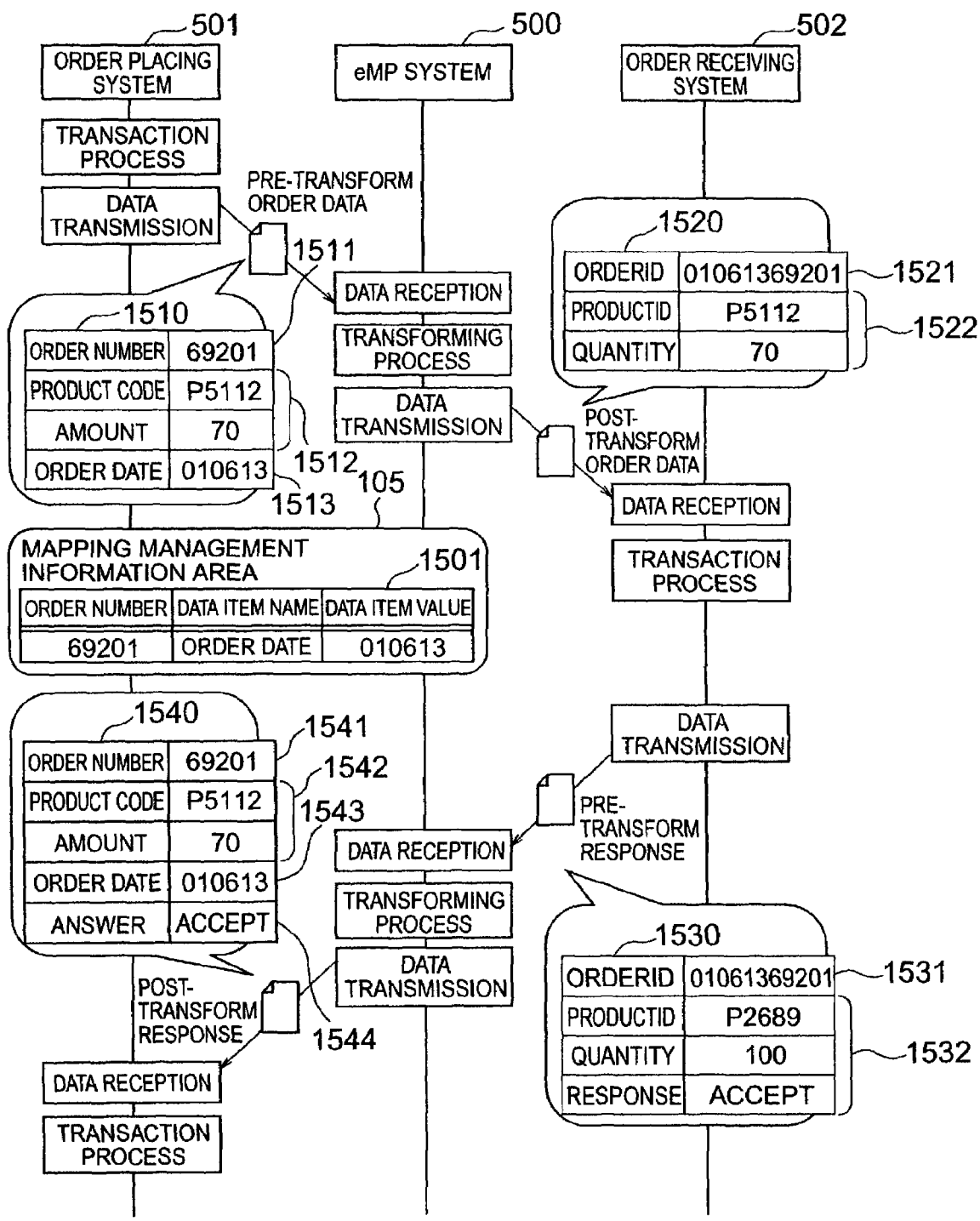
FIG. 13 is a diagram illustrating the operation principle of a seventh data transforming method.

With reference to FIG. 13, the procedure of the seventh data transforming method will be described. FIG. 13 is a diagram illustrating the operation principle of the seventh data transforming method.

The sixth data transforming method has two characteristic points.

According to the first characteristic point, similar to the sixth data transforming method, the type of the data transforming method and the specified value of a data item can be designated in the mapping definition information in correspondence with a pair of the sets of transform source data items and the set of transform destination data items.

According to the second characteristic point, the value of a data item of pre-transform order data which value was embedded in post-transform order data and is necessary for the response data transforming process can be stored in the mapping management information.

In this embodiment, the data transforming program 100 is implemented with the seventh data transforming method having the above-described characteristic points. Transaction data is transferred between the order placing system and order receiving system by the following procedure.

Similar to the fifth data transforming method, the data transforming program 100 embeds the value of a data item of pre-transform order data necessary for the response data transforming process in post-transform order data, and at the same time stores a set of the value of a data item of pre-transform order data and an identification number of the order data in the mapping management information area. In the example shown in FIG. 13, a value "010613" of the data item "Order date" of pre-transform order data 1510 is coupled to a value "69201" of the data item "Order number", and a character string "01061369201" 1521 is written as the value of the corresponding data item "OrderId" of post-transform order data 1520. At the same time, a three-set 1501 of: the value "69201" of the data item "Order number" of the pre-transform order data 1510; the name "Order date" of the data item to be embedded in the post-transform order data; and the value "69201" of this data item, is written in the mapping management information area 105. Values "P5112" and "70" 1522 of the data items "Product code" and "Amount" of the pre-transform order data 1510 are written as the values of the corresponding data items "ProductId" and "Quality" of the post-transform order data 1520.

Similar to the fifth data transforming method, the data transforming program 100 executes the response data transforming process of deriving the values of a plurality of data items from the pre-transform response data in accordance with the data transforming method designated by the mapping definition information to thereby output post-transform response data. Then, the values derived from the pre-transform response data are compared with the values stored in the mapping management information area. If the comparison result shows that there is a difference between two sets of the values, the specified values defined in the mapping definition information are written in the transform destination data items. In the example shown in FIG. 13, the deriving process is performed for the input character string "01061369201" which is the value of the data item "OrderId" of pre-transform response data 1530, and the values "69201" and "010613" 1541, 1543 of the data items "Order number" and "Order date" of post-transform response data 1540 are written. Next, the value of the derived data item "Order date" is compared with the value stored in the mapping management information area 105. In the mapping management information area 105, a pair of the order number "69201" and data item name "Order date" is related to the character string "010613" 1501. It can therefore be known that the value of the derived data item is the same as the value in the mapping management information area 105.

Next, values "P5112", "70" and "Accept" 1542, 1544 of the data items "ProductId", "Quantity" and "Response" of the pre-transform response data 1530 are written as the values of the data items "Product code", "Amount" and "Answer" of the post-transform response data 1540.

The procedure of the seventh data transforming method has been described above. With this procedure, in the mapping definition if the value of a data item of pre-transform order data necessary for the response data transforming process is stored in the mapping management information area, it becomes possible to compare the value of a data item of the pre-transform order data embedded in the post-transform order data with a value written in pre-transform response data. The object of the seventh data transforming method can therefore be achieved by this procedure.

According to the invention, transaction data can be transferred between information systems implemented with different business protocols.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A data transforming method for a data transforming system installed between first and second information processing systems, said first information processing system transmitting request data in accordance with a first business protocol and said second information processing system returning response data to the request data in accordance with a second business protocol, said first business protocol being constituted of a format of transaction data containing data item information and data defined by the data item information and a transmission/reception procedure of transmitting request data and returning response data to the request data, the data transforming method comprising steps of:

receiving request data containing a plurality of requests transmitted from said first information processing system in accordance with said first business protocol;

acquiring a plurality of business protocols including the first business protocol and the second business protocol, each business protocol corresponding to the data item information of the received request data according to mapping definition information, duplicating the data item information belonging to the first business protocol, generating a plurality of request data sets by coupling the duplicated data item information with the data item information belonging to the second business protocol, and transmitting said plurality of request data sets generated to said second information processing system in accordance with said second business protocol;

receiving a plurality of response data sets each returned from said second information processing system, corresponding to each of said plurality of requests and having a format defined by said second business protocol; and collecting said plurality of response data sets, transforming said plurality of response data sets into a plurality of response data sets corresponding to the plurality of requests and having a format defined by said first business protocol, and transmitting said plurality of response data sets transformed to said first information processing system in accordance with said first business protocol.

2. A data transforming method for a data transforming system installed between first and second information processing systems, said first information processing system transmitting request data in accordance with a first business protocol and said second information processing system returning response data to the request data in accordance with a second business protocol, said first business protocol being constituted of a format of transaction data containing data item information and data defined by the data item information and a transmission/reception procedure of transmitting request data and returning response data to the request data, the data transforming method comprising steps of:

receiving request data transmitted from said first information processing system in accordance with said first business protocol;

acquiring a plurality of business protocols including the first business protocol and the second business protocol, each business protocol corresponding to the data item information of the received request data according to mapping definition information, duplicating the data item information belonging to the first business protocol, generating a plurality of request data sets by coupling the duplicated data item information with the data item information belonging to the second business protocol, and transmitting the generated request data to said second information processing system in accordance with said second business protocol;

receiving the response data corresponding to said request data returned from said second information processing system in accordance with said second business protocol; and deriving the value of the data item to be inherited to the response data having a format defined by said first business protocol from said receiving response data containing the value of said data item having the different meaning to transform the derived value of the data item of said response data, and transmitting said transformed response data to said first information processing system in accordance with said first business protocol.

3. A data transforming method according to claim 1, wherein a combination of identification information of said request data containing the plurality of requests and having the format defined by said first business protocol and a sequence number of each of said plurality of requests is output as the request data having the formed defined by said second business protocol.

4. A data transforming method according to claim 1, wherein if a plurality of response data sets each containing an individual request and having the format defined by said second business protocol are not collected before an arrival time limit, an error is noticed to said second information processing system.

5. A data transforming method according to claim 1, wherein if a plurality of response data sets each containing an individual request and having the format defined by said second business protocol are not collected before an arrival time limit, response data sets received before the arrived time limit are collected and output as response data sets containing a plurality of requests and having the format defined by said first business protocol.

6. A data transforming method according to claim 2, wherein a value of the response data having the format defined by said second business protocol is not output as a value of the response data having the format defined by said first business protocol, but predetermined data corresponding to the data item of the response data is output.

7. A data transforming method according to claim 2, wherein a value of the response data having the format defined by said second business protocol is compared with a value stored in advance to judge whether there is a difference of a value of the data item.

8. A data transforming method according to claim 1, wherein a value is output to a data item determined by an output destination data item selecting process and corresponding to a data item of the transaction data used as an input for said transforming step.

9. A data transforming method according to claim 1, wherein mapping definition information is selected in accordance with a pair of transform source and destination business protocols, the mapping definition information designating a rule of transforming transform source and destination transaction data, and the transform source transaction data is transformed and output in accordance with the selected mapping definition information.

10. A data transforming system installed between first and second information processing systems, said first information processing system transmitting request data in accordance with a first business protocol and said second information processing system returning response data to the request data in accordance with a second business protocol, said first business protocol being constituted of a format of transaction data containing data item information and data defined by the data item information and a transmission/reception procedure of transmitting request data and returning response data to the request data, the data transforming system comprising:

means for receiving request data containing a plurality of requests transmitted from said first information processing system in accordance with said first business protocol;

means for acquiring a plurality of business protocols including the first business protocol and the second business protocol, each business protocol corresponding to the data item information of the received request data according to mapping definition information, duplicating the data item information belonging to the first business protocol, generating a plurality of request data sets by coupling the duplicated data item information with the data item information belonging to the second business protocol, and transmitting said plurality of request data sets generated to said second information processing system in accordance with said second business protocol;

means for receiving a plurality of response data sets each returned from said second information processing system, corresponding to each of said plurality of requests and having a format defined by said second business protocol; and means for collecting said plurality of response data sets, transforming said plurality of response data sets into a plurality of response data sets corresponding to the plurality of requests and having a format defined by said first business protocol, and transmitting said plurality of response data sets transformed to said first information processing system in accordance with said first business protocol.

11. A data transforming system installed between first and second information processing systems, said first information processing system transmitting request data in accordance with a first business protocol and said second information processing system returning response data to the request data in accordance with a second business protocol, said first business protocol being constituted of a format of transaction data containing data item information and data defined by the data item information and a transmission/reception procedure of transmitting request data and returning response data to the request data, the data transforming system comprising:

means for receiving request data transmitted from said first information processing system in accordance with said first business protocol;

means for acquiring a plurality of business protocols including the first business protocol and the second business protocol, each business protocol corresponding to the data item information of the received request data according to mapping definition information, duplicating the data item information belonging to the first business protocol, generating a plurality of request data sets by coupling the duplicated data item information with the data item information belonging to the second business protocol, transmitting the generated request data to said second information processing system in accordance with said second business protocol;

means for receiving the response data corresponding to said request data returned from said second information processing system in accordance with said second business protocol; and means for deriving the value of the data item to be inherited to the response data having a format defined by said first business protocol from said received response data containing the value of said data item having the different meaning to transform the derived value of the data item of said response data, and transmitting said transformed response data to said first information processing system in accordance with said first business protocol.

12. A computer-readable storage medium having instructions stored thereon for executing a data transforming method for a data transforming system installed between first and second information processing systems, said first information processing system transmitting request data in accordance with a first business protocol and said second information processing system returning response data to the request data in accordance with a second business protocol, said first business protocol being constituted of a format of transaction data containing data item information and data defined by the data item information and a transmission/reception procedure of transmitting request data and returning response data to the request data, the data transforming method comprising the steps of:

receiving request data containing a plurality of requests transmitted from said first information processing system in accordance with said first business protocol;

acquiring a plurality of business protocols including the first business protocol and the second business protocol, each business protocol corresponding to the data item information of the received request data according to mapping definition information, duplicating the data item information belonging to the first business protocol, generating a plurality of request data sets by coupling the duplicated data item information with the data item information belonging to the second business protocol, and transmitting said plurality of request data sets generated to said second information processing system in accordance with said second business protocol;

receiving a plurality of response data sets each returned from said second information processing system, corresponding to each of said plurality of requests and having a format defined by said second business protocol; and collecting said plurality of response data sets, transforming said plurality of response data sets into a plurality of response data sets corresponding to the plurality of requests and having a format defined by said first business protocol, and transmitting said plurality of response data sets transformed to said first information processing system in accordance with said first business protocol.

13. A computer-readable storage medium having instructions stored thereon for executing a data transforming method for a data transforming system installed between first and second information processing systems, said first information processing system transmitting request data in accordance with a first business protocol and said second information processing system returning response data to the request data in accordance with a second business protocol, said first business protocol being constituted of a format of transaction data containing data item information and data defined by the data item information and a transmission/reception procedure of transmitting request data and returning response data to the request data, the data transforming method comprising the steps of:

receiving request data transmitted from said first information processing system in accordance with said first business protocol;

acquiring a plurality of business protocols including the first business protocol and the second business protocol, each business protocol corresponding to the data item information of the received request data according to mapping definition information, duplicating the data item information belonging to the first business protocol, generating a plurality of request data sets by coupling the duplicated data item information with the data item information belonging to the second business protocol, and transmitting the generated request data to said second information processing system in accordance with said second business protocol;

receiving the response data corresponding to said request data returned from said second information processing system in accordance with said second business protocol; and deriving the value of the data item to be inherited to the response data having a format defined by said first business protocol from said received response data containing the value of said data item having the different meaning to transform the derived value of the data item of said response data, and transmitting said transformed response data to said first information processing system in accordance with said first business protocol.

* * * * *